US011623296B2

(12) United States Patent
Takata et al.

(10) Patent No.: US 11,623,296 B2
(45) Date of Patent: Apr. 11, 2023

(54) PLASMA CUTTING MACHINE AND CONTROL METHOD THEREFOR

(71) Applicant: KOMATSU INDUSTRIES CORPORATION, Kanazawa (JP)

(72) Inventors: Nobuhiro Takata, Kanazawa (JP); Yoshihiro Yamaguchi, Kanazawa (JP)

(73) Assignee: KOMATSU INDUSTRIES CORPORATION, Ishikawa (JP)

( * ) Notice: Subject to any disclaimer, the term of this patent is extended or adjusted under 35 U.S.C. 154(b) by 218 days.

(21) Appl. No.: 17/102,798

(22) Filed: Nov. 24, 2020

(65) Prior Publication Data

US 2021/0283710 A1 Sep. 16, 2021

(30) Foreign Application Priority Data

Mar. 10, 2020 (JP) .............................. JP2020-040651

(51) Int. Cl.
*B23K 10/00* (2006.01)

(52) U.S. Cl.
CPC .................................. *B23K 10/006* (2013.01)

(58) Field of Classification Search
CPC .................................................. B23K 10/006
USPC ..................................................... 219/121.39
See application file for complete search history.

(56) References Cited

U.S. PATENT DOCUMENTS

| 3,076,085 | A | * | 1/1963 | Sundstrom | ............. | B23K 9/291 |
| | | | | | | 219/75 |
| 5,763,852 | A | * | 6/1998 | Brolund | ................. | B23K 10/00 |
| | | | | | | 219/121.58 |
| 2004/0173583 | A1 | * | 9/2004 | Iriyama | .................... | H05H 1/36 |
| | | | | | | 219/121.53 |
| 2013/0264317 | A1 | * | 10/2013 | Hoffa | ....................... | B23K 9/32 |
| | | | | | | 219/121.53 |
| 2013/0264320 | A1 | * | 10/2013 | Shipulski | ................. | B23K 9/32 |
| | | | | | | 219/130.01 |
| 2014/0061170 | A1 | * | 3/2014 | Lindsay | ............... | B23K 10/006 |
| | | | | | | 219/121.54 |
| 2015/0027999 | A1 | * | 1/2015 | Yamaguchi | ............ | B23K 10/00 |
| | | | | | | 219/121.44 |
| 2015/0144603 | A1 | * | 5/2015 | Shipulski | ............... | B23K 10/00 |
| | | | | | | 219/121.49 |

(Continued)

FOREIGN PATENT DOCUMENTS

| CN | 105537785 | A | * | 5/2016 | |
| JP | 2004-237321 | A | | 8/2004 | |
| JP | 2004237321 | A | * | 8/2004 | ............... H05H 1/26 |

*Primary Examiner* — Jimmy Chou
(74) *Attorney, Agent, or Firm* — Global IP Counselors, LLP (57) ABSTRACT

A plasma cutting machine cuts a work piece with a plasma arc. The plasma cutting machine includes a plasma torch, a drive device, and a controller. The plasma torch includes an electrode and a nozzle and generates the plasma arc. The drive device moves the plasma torch. The controller includes a storage device and controls the drive device. The storage device records information pertaining to the plasma cutting machine. The controller acquires a weight of a work piece. The controller acquires a consumption amount of at least one of the electrode and the nozzle. The controller records, in the storage device, processing performance data including the weight of the work piece and the consumption amount correlated with each other.

10 Claims, 8 Drawing Sheets

(56) References Cited

U.S. PATENT DOCUMENTS

| | | | |
|---|---|---|---|
| 2015/0158109 A1* | 6/2015 | Chantry | B23K 9/0953 |
| | | | 219/121.55 |
| 2015/0296605 A1* | 10/2015 | Yamaguchi | H05H 1/34 |
| | | | 219/121.44 |
| 2016/0221108 A1* | 8/2016 | Hoffa | G05B 19/182 |
| 2019/0232443 A1* | 8/2019 | Kitajima | B23Q 1/017 |
| 2022/0108087 A1* | 4/2022 | Hoffa | B23K 10/006 |

* cited by examiner

| RESET DATE AND TIME | NOZZLE TYPE | USAGE RATE % | REASON FOR REPLACEMENT | ARC TIME PERIOD | PIERCING FREQUENCY |
|---|---|---|---|---|---|
| 2019/12/01 8:20 | φ2.2 | 100 | LIFETIME | 3h 3min 10s | 550 |
| 2019/12/02 9:30 | φ2.2 | 100 | LIFETIME | 2h 34min 12s | 610 |
| 2019/12/02 13:20 | φ1.6 | 100 | LIFETIME | 2h 30min 00s | 1100 |
| | | | | | |
| | | | | | |
| | | | | | |
| | | | | | |
| | | | | | |
| | | | | | |

DISPLAY PERIOD [ONE DAY] [ONE WEEK] [ONE MONTH] [ALL ITEMS]   [HISTORY OUTPUT]

FIG. 7

| PROGRAM | STARTING TIME | ENDING TIME | PROCESSING TIME PERIOD | PRODUCT WEIGHT | NOZZLE TYPE | USAGE RATE | ARC TIME PERIOD | PIERCING FREQUENCY |
|---|---|---|---|---|---|---|---|---|
| 110h | 2019/12/01 8:30 | 2019/12/01 10:20 | 110h | 1372.8t | φ2.2 | 80% | 100h | 150 |
| 132h | 2019/12/01 11:00 | 2019/12/01 13:12 | 132h | 1647.3t | φ2.2 | 110% | 125h | 180 |
| 100h | 2019/12/01 15:00 | 2019/12/01 16:40 | 100h | 900t | φ1.6 | 80% | 92h | 143 |
| 60h | 2019/12/01 18:00 | 2019/12/01 19:00 | 60h | 540t | φ1.6 | 60% | 55h | 85 |
| | | | | | | | | |
| | | | | | | | | |
| | | | | | | | | |

DISPLAY PERIOD [ONE DAY] [ONE WEEK] [ONE MONTH] [ALL ITEMS] [HISTORY OUTPUT]

FIG. 8

| PROGRAM | STARTING TIME | ENDING TIME | PROCESSING TIME PERIOD | PRODUCT WEIGHT | NOZZLE TYPE | USAGE RATE | ARC TIME PERIOD | PIERCING FREQUENCY | PROCESSING COST |
|---|---|---|---|---|---|---|---|---|---|
| 110h | 2019/12/01 8:30 | 2019/12/01 10:20 | 110h | 1372.8t | φ2.2 | 80% | 100h | 150 | *** |
| 132h | 2019/12/01 11:00 | 2019/12/01 13:12 | 132h | 1647.3t | φ2.2 | 110% | 125h | 180 | *** |
| 100h | 2019/12/01 15:00 | 2019/12/01 16:40 | 100h | 900t | φ1.6 | 80% | 92h | 143 | *** |
| 60h | 2019/12/01 18:00 | 2019/12/01 19:00 | 60h | 540t | φ1.6 | 60% | 55h | 85 | *** |
| | | | | | | | | | |
| | | | | | | | | | |
| | | | | | | | | | |

DISPLAY PERIOD [ONE DAY] [ONE WEEK] [ONE MONTH] [ALL ITEMS] [HISTORY OUTPUT]

FIG. 9

PLASMA CUTTING MACHINE AND CONTROL METHOD THEREFOR

CROSS-REFERENCE TO RELATED APPLICATIONS

This application claims priority to Japanese Patent Application No. 2020-040651 filed on Mar. 10, 2020, the disclosure of which is hereby incorporated herein by reference in its entirety.

BACKGROUND

Field of the Invention

The present invention relates to a plasma cutting machine and a control method therefor.

Background Information

A plasma cutting machine includes a plasma torch that includes an electrode and a nozzle. The plasma cutting machine generates a plasma arc in the plasma torch and moves the plasma torch to cut a work piece.

The electrode and the nozzle are consumed due to the repeated cutting of the work piece. When the consumption amount of the electrode or the nozzle reaches a predetermined amount, the electrode or the nozzle is replaced with a new one. For example, in the plasma processing device of Japanese Laid-Open Patent Publication No. 2004-237321, the consumption amounts of the electrode and the nozzle are recorded in a storage device. A lifetime management screen that includes the consumption amounts is displayed on a display unit. A user ascertains the consumption amounts of the electrode and the nozzle with the lifetime management screen and learns the proper replacement periods for the electrode and the nozzle.

SUMMARY

The processing cost of the plasma cutting machine is greatly influenced by the costs of the electrode and the nozzle. In particular, accurately understanding the processing cost with respect to a processing amount is an important management point for operating a plasma cutting machine. However, in the aforementioned technology, it is difficult to accurately understand the processing cost with respect to the processing amount.

An object of the present disclosure is to accurately understand processing cost with respect to a processing amount in a plasma cutting machine.

A first aspect of the present disclosure is a plasma cutting machine for cutting, with a plasma arc, a work piece. The plasma cutting machine includes a plasma torch, a drive device, a storage device, and a controller. The plasma torch includes an electrode and a nozzle and generates a plasma arc. The drive device moves the plasma torch. The controller includes a storage device and controls the drive device. The storage device records information pertaining to the plasma cutting machine. The controller acquires the weight of the work piece. The controller acquires the consumption amount of the electrode and/or the nozzle. The controller records, in the storage device, processing performance data that includes the weight of the work piece and the consumption amount correlated with each other.

A second aspect of the present disclosure is a control method for a plasma cutting machine. The plasma cutting machine cuts a work piece with a plasma arc generated by a plasma torch. The plasma torch includes an electrode and a nozzle. The control method includes the following processes. A first process is acquiring the weight of the work piece. A second process is acquiring the consumption amount of the electrode and/or the nozzle. A third process is recording processing performance data that includes the weight of the work piece and the consumption amount correlated with each other.

DETAILED DESCRIPTION OF EMBODIMENT(S)

Figure 1:
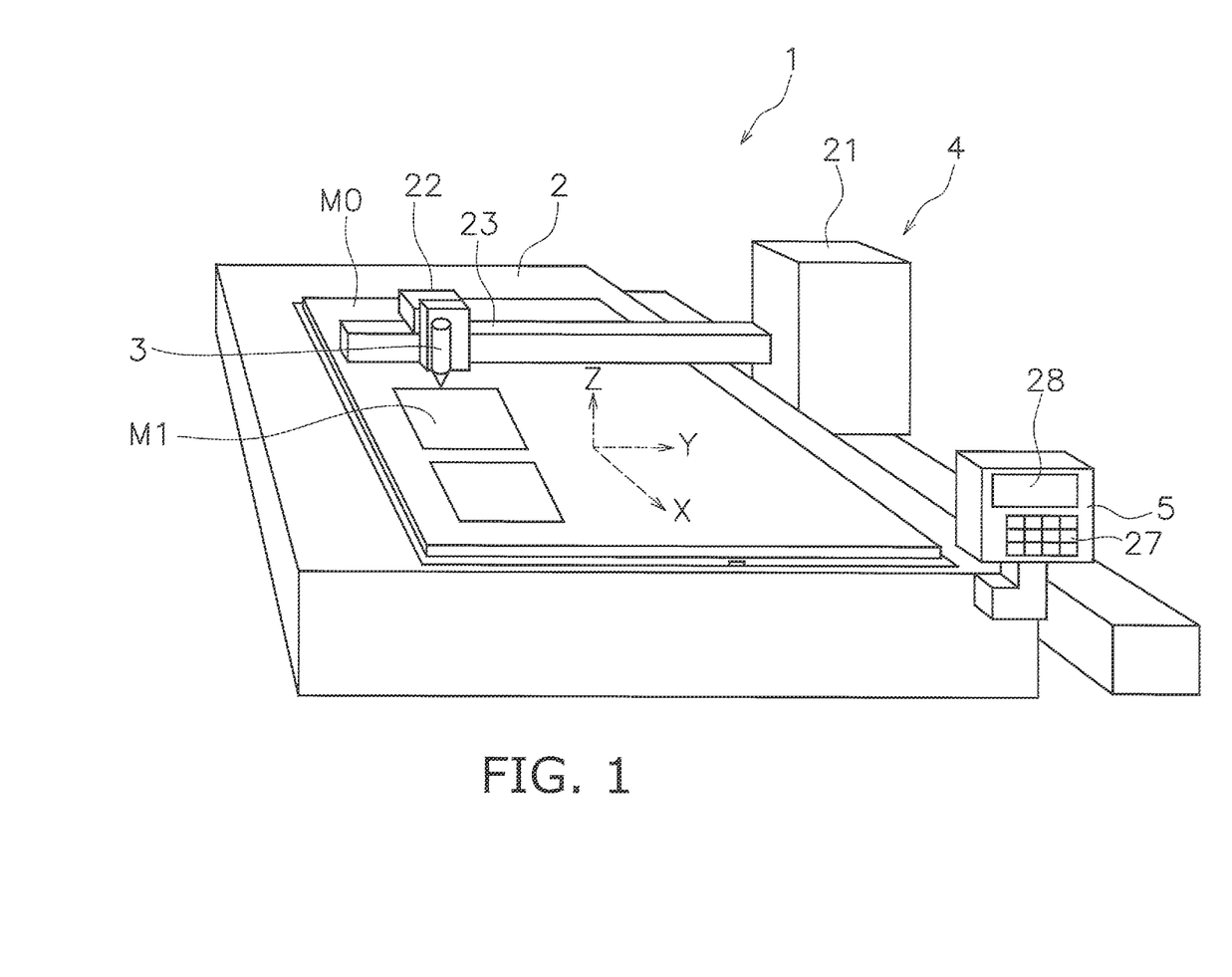
FIG. 1 illustrates a configuration of a plasma cutting machine according to an embodiment.

Hereinafter, an embodiment of the present invention will be described with reference to the drawings. FIG. 1 illustrates a configuration of a plasma cutting machine 1 according to an embodiment. As illustrated in FIG. 1, the plasma cutting machine 1 includes a table 2, a plasma torch 3, a drive device 4, and a controller 5. A raw material MO is placed on the table 2. The raw material MO is a plate-like material such as a metal plate.

Figure 2:
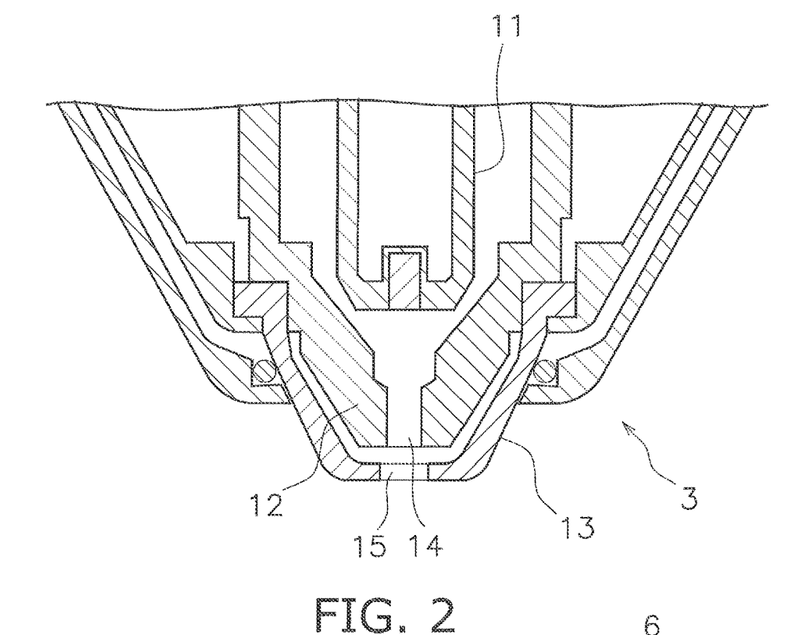
FIG. 2 is a cross-sectional view illustrating a portion of a plasma torch.

The plasma torch 3 emits a plasma arc and uses heat to cut a work piece M1 from the raw material MO. FIG. 2 is a cross-sectional view of the plasma torch 3. As illustrated in FIG. 2, the plasma torch 3 includes an electrode 11, a nozzle 12, and a shield cap 13. The tip end of the electrode 11 is disposed in the nozzle 12. The nozzle 12 includes an emission hole 14. The emission hole 14 of the nozzle 12 faces the tip end of the electrode 11. The shield cap 13 covers the nozzle 12. The shield cap 13 includes an emission hole 15 that faces the emission hole 14 of the nozzle 12. The plasma torch 3 generates a plasma arc by an arc discharge between the electrode 11 and the raw material MO.

The drive device 4 moves the plasma torch 3 above the table 2. Specifically the drive device 4 moves the plasma torch 3 in the X direction (longitudinal), the Y direction (latitudinal), and the Z direction (height) with respect to the raw material MO. The drive device 4 has a first carriage 21, a second carriage 22, and an arm 23. The first carriage 21 moves in the X direction along the side of the table 2. The arm 23 is disposed above the table 2. The arm 23 extends from the first carriage 21 in the Y direction. The second carriage 22 is supported so that the plasma torch 3 is able to move in the Z direction. The second carriage 22 moves in the Y direction above the arm 23.

Figure 3:
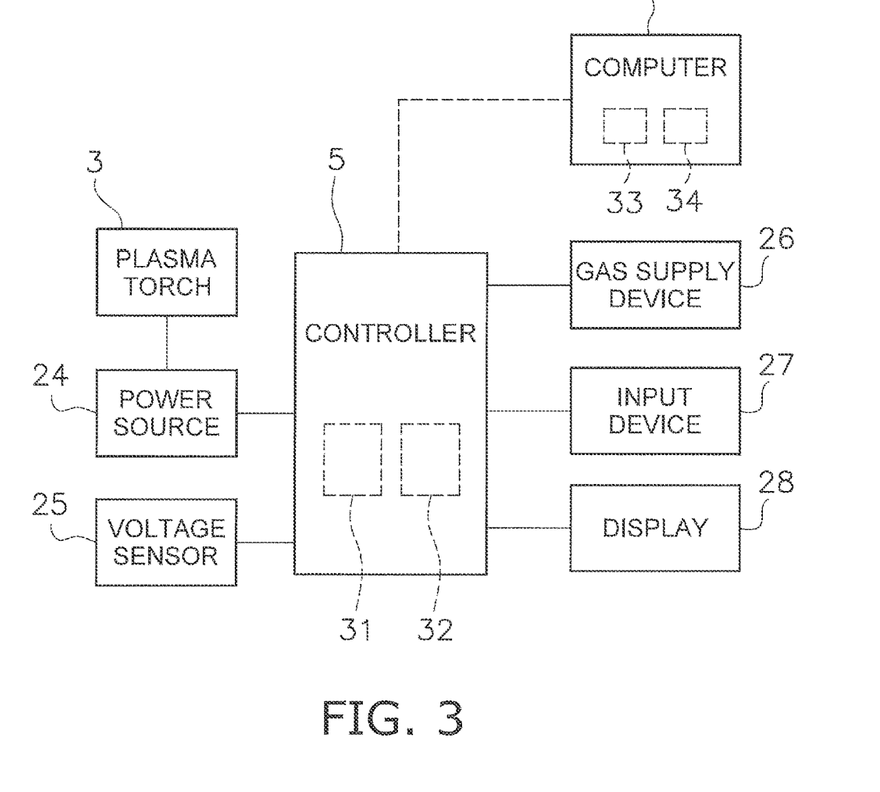
FIG. 3 is a block diagram illustrating a configuration of the plasma cutting machine.

FIG. 3 is a block diagram illustrating a configuration of the plasma cutting machine 1. As illustrated in FIG. 3, the plasma cutting machine 1 includes a power source 24, a voltage sensor 25, a gas supply device 26, an input device 27, and a display 28. The power source 24 is electrically connected to the plasma torch 3. The power source 24 supplies power for generating the plasma arc, to the plasma torch 3. The power source 24 includes, for example, a rectifier, an inverter, and a transformer.

The voltage sensor 25 detects the arc voltage applied to the plasma torch 3 from the power source 24. The voltage sensor 25 outputs a signal indicating the arc voltage. The gas supply device 26 supplies plasma gas to the plasma torch 3. The plasma torch 3 generates the plasma arc while emitting the plasma gas from the nozzle 12.

The input device 27 includes, for example, a plurality of input keys. An operator uses the input device 27 to input data such as processing conditions. The input device 27 outputs signals indicating the inputted data. The input device 27 may be a touch screen. The display 28 displays information pertaining to the plasma cutting machine 1. The display 28 is, for example, an LCD, an OELD display, or the like.

The controller 5 controls the emission of the plasma arc from the plasma torch 3 and controls the movement of the plasma torch 3 by the drive device 4. Consequently, the controller 5 controls the plasma cutting machine 1 so as to cut the work piece M1 of a desired shape from the raw material MO. The controller 5 includes a processor 31 such as a CPU, and a storage device 32. The storage device records information pertaining to the plasma cutting machine 1. The storage device 32 includes a non-volatile memory such as a ROM and a volatile memory such as a RAM. The storage device 32 may include an auxiliary storage device such as a hard disk or a solid state drive (SSD). The storage device 32 is an example of a non-transitory computer-readable recording medium.

The controller 5 communicates with a computer 6 outside of the plasma cutting machine 1. The computer 6 includes a processor 33 and a storage device 34, similarly to the controller 5. Design data that includes the shape, the plate thickness, and the weight of the raw material MO and the target shape of the work piece M1, is inputted to the computer 6. The computer 6 generates a cutting program based on the design data. The cutting program represents the track of the plasma torch 3 for cutting the work piece M1 from the raw material MO. The controller 5 acquires the cutting program from the computer 6. The controller 5 controls the plasma cutting machine 1 to cut the work piece M1 from the raw material MO in accordance with the cutting program.

In the present embodiment, the controller 5 has a function for automatically tallying the processing performance of the plasma cutting machine 1 and the consumption amounts of the consumable parts, and saving the processing performance and the consumption amounts as processing performance data. Processing pertaining to the processing performance data by the controller 5 is discussed below.

Figure 4:
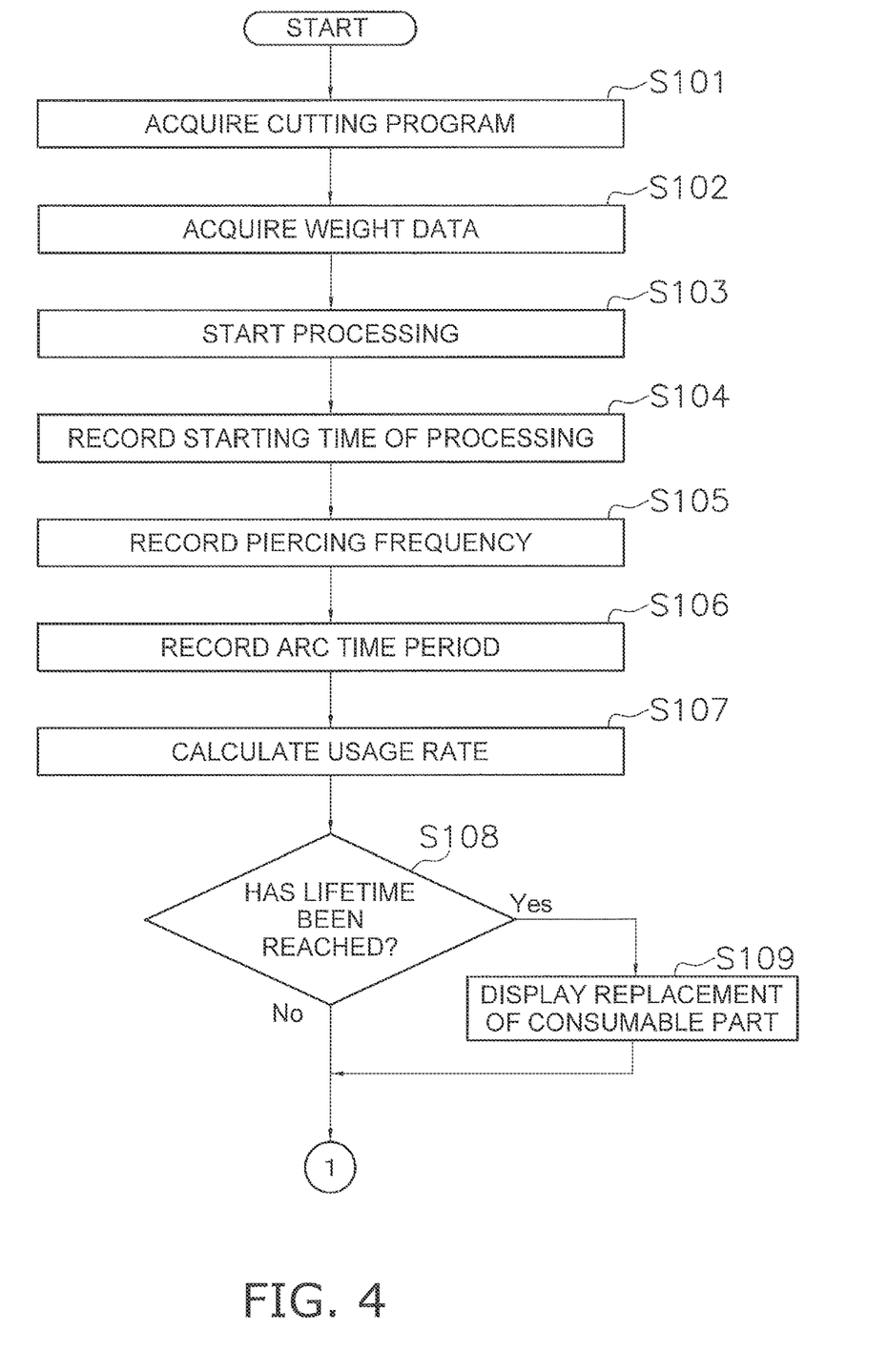
FIG. 4 is a flow chart illustrating processing for controlling the plasma cutting machine.
Figure 5:
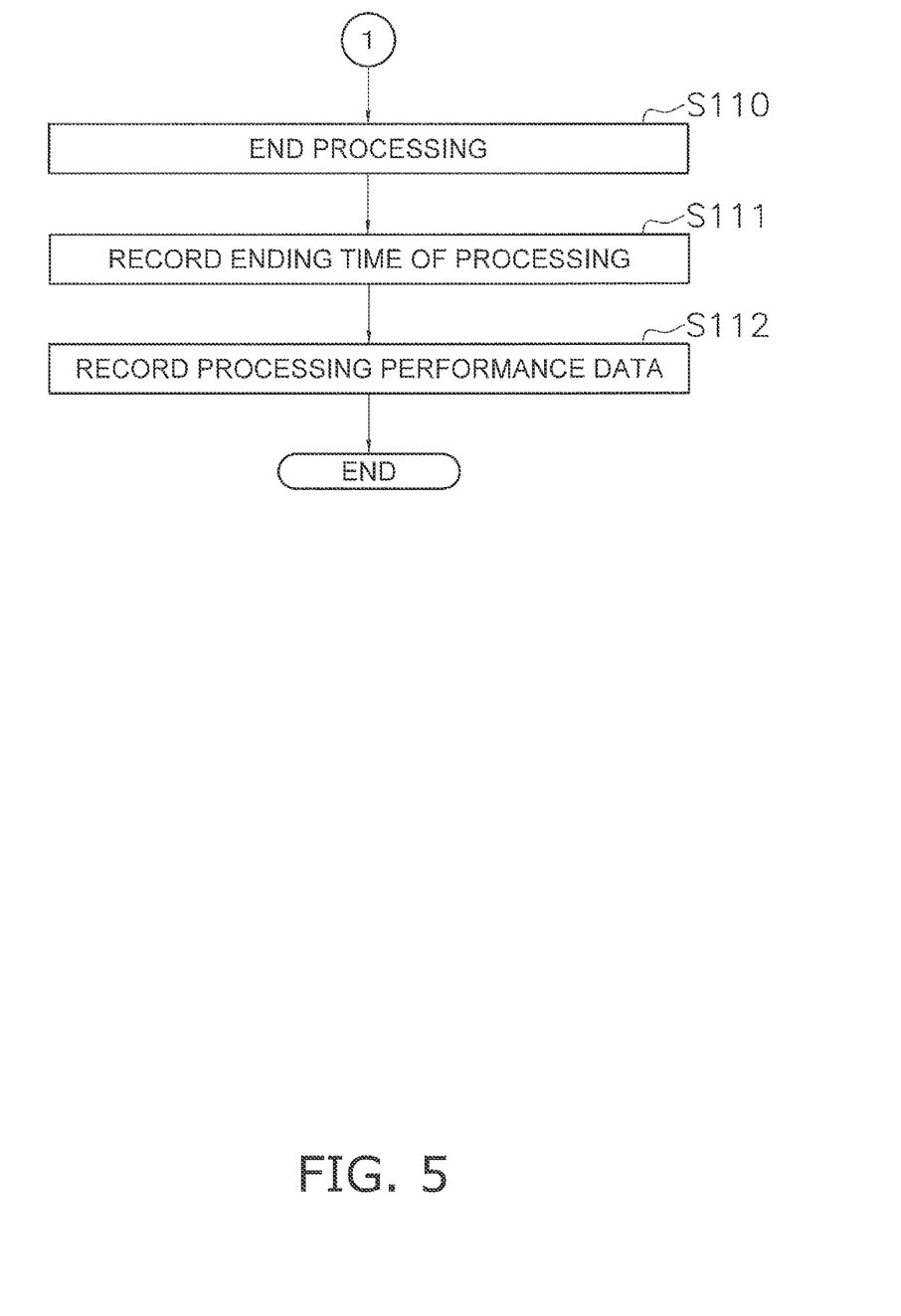
FIG. 5 is a flow chart illustrating processing for controlling the plasma cutting machine.

FIGS. 4 and 5 are flow charts illustrating processing executed by the controller 5 for controlling the plasma cutting machine 1. In step S101 as illustrated in FIG. 4, the controller 5 acquires the cutting program. The controller 5 acquires the cutting program from the computer 6 as indicated above.

In step S102, the controller 5 acquires weight data. The weight data indicates the weight of the work piece M1. The controller 5 acquires the weight data of the work piece M1 from the computer 6. The weight data is included in the cutting program. The computer 6 calculates the weight of the work piece M1 to be cut in accordance with the cutting program. When a plurality of work pieces M1 are to be cut from the raw material MO, the computer 6 calculates the total weight of the plurality of work pieces M1 as the weight data. The computer 6 embeds the weight data of the work piece M1 in the cutting program and transmits the cutting program to the controller 5. For example, the computer 6 embeds the weight data into a header of the cutting program.

In step S103, the controller 5 starts the processing. The controller 5 controls the drive device 4, the power source 24, and the gas supply device 26 according to the cutting program. Consequently, the plasma torch 3 moves over the raw material MO while emitting the plasma arc and the plasma gas. As a result, the work piece M1 is cut from the raw material MO.

In step S104, the controller 5 records the starting time of the processing. The starting time of the processing indicates the date and the point in time that the processing was started. In step S105, the controller 5 records the piercing frequency. The piercing frequency indicates the number of times that the plasma was ignited. In step S106, the controller 5 records the arc time period. The arc time period indicates the total amount of time that an arc was generated.

In step S107, the controller 5 calculates the usage rate of the consumable parts. The consumable parts include the electrode 11 and the nozzle 12. The controller 5 calculates the usage rate of the electrode 11 and the usage rate of the nozzle 12. The usage rate indicates the machine lifetime of the electrode 11 or of the nozzle 12 as percentage based on 100%. The controller 5 has estimation data that defines relationships between the piercing frequency, the arc time period, and the usage rates. The usage rates represent the consumption amounts of the electrode 11 and the nozzle 12 and increase in response to an increase in the piercing frequency and the arc time period. The controller 5 refers to the estimation data and calculates the usage rates from the current piercing frequency and the arc time period.

In step S108, the controller 5 determines whether the electrode 11 or the nozzle 12 has reached the machine lifetime. The controller 5 determines that the electrode 11 or the nozzle 12 has reached the machine lifetime when the respective usage rate has reached a predetermined threshold (for example, 100%). The processing advances to step S109 when the electrode 11 or the nozzle 12 has reached the machine lifetime.

In step S109, the controller 5 displays a replacement display of a consumable part on the display 28. For example, when the nozzle 12 has reached the machine lifetime, the controller 5 displays the replacement display for urging the replacement of the nozzle 12 on the display 28. When the electrode 11 has reached the machine lifetime, the controller 5 displays the replacement display for urging the replacement of the electrode 11 on the display 28.

Figure 6:
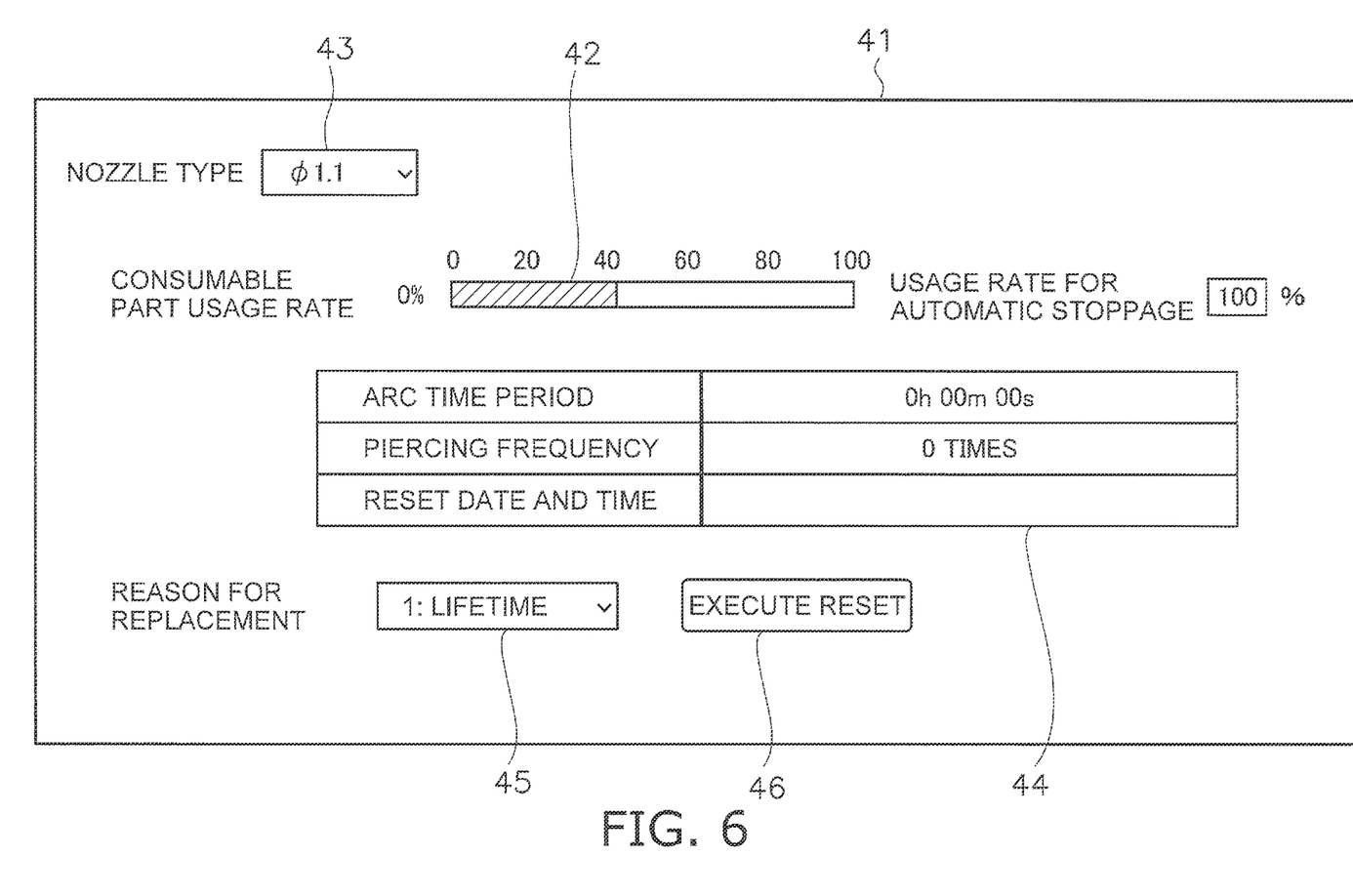
FIG. 6 illustrates a part replacement screen.

FIG. 6 illustrates a part replacement screen 41 when implementing the replacement of a consumable part. The controller 5 displays the part replacement screen 41 on the display 28 when implementing the replacement of a consumable part. FIG. 6 illustrates the part replacement screen 41 when implementing the replacement of the nozzle 12. As illustrated in FIG. 6, the part replacement screen 41 includes a display 42 which indicates the usage rate of the consumable part. The part replacement screen 41 includes a display 43 which indicates the type the consumable part. The type of the consumable part is, for example, the size of the consumable part.

The part replacement screen 41 includes a display 44 which indicates information of the consumable part. The information of the consumable part includes the arc time period and the piercing frequency while the consumable part is being used. The information of the consumable part includes the date and time of a previous reset. The part replacement screen 41 includes a display 45 for selecting a replacement reason. The replacement reason includes, for example, the lifetime, a breakdown, or the like. The part replacement screen 41 includes a reset button 46. When the reset button 46 is pressed, the controller 5 records the replacement history data which indicates that the consumable part has been replaced.

Figure 7:
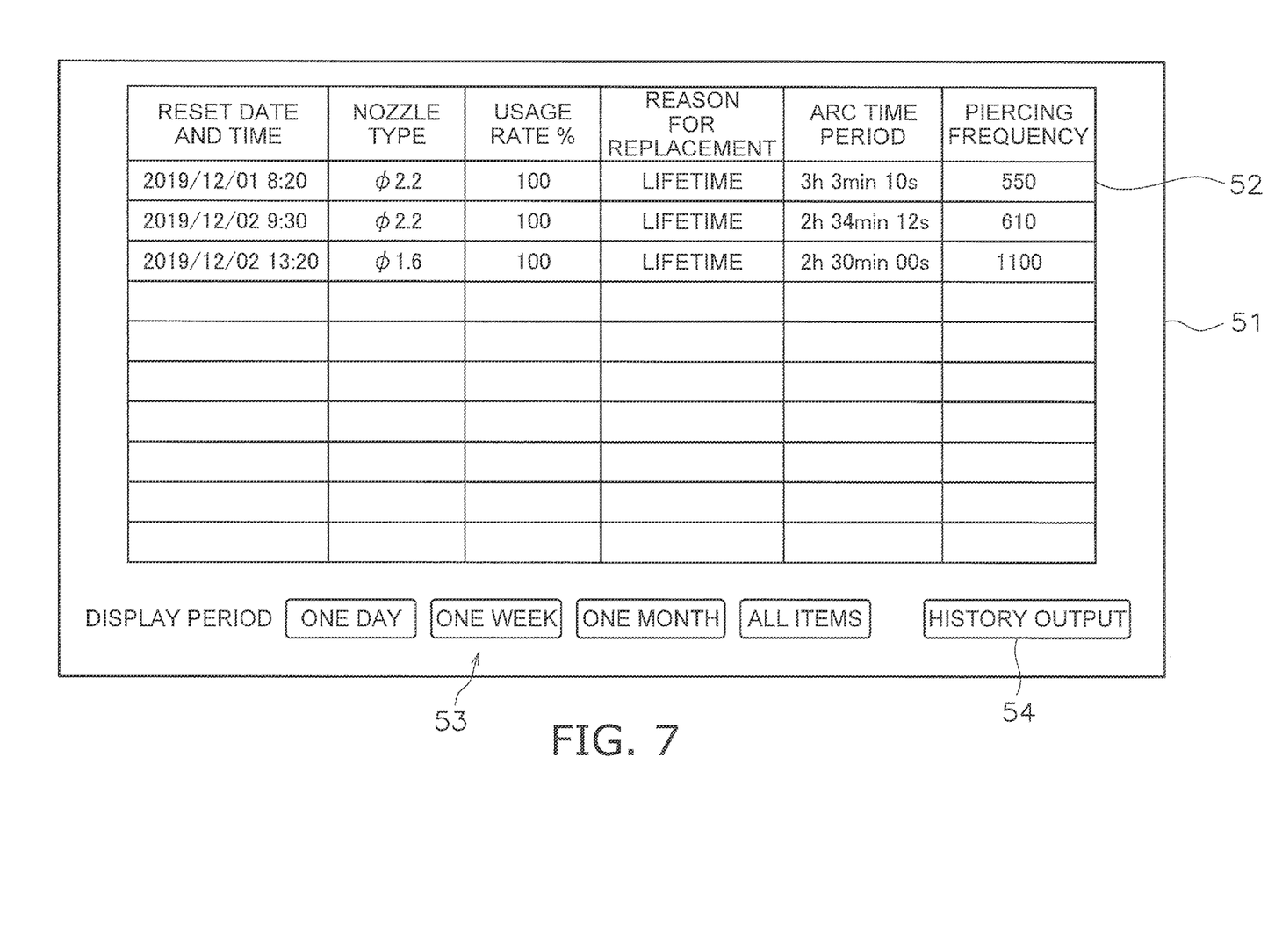
FIG. 7 illustrates a screen for replacement history data.

FIG. 7 illustrates a screen 51 for the replacement history data. The controller 5 displays the screen 51 for the replacement history data on the display 28. The screen 51 for the replacement history data includes a list 52 of the replacement history data for each replaced consumable part. The replacement history data includes the date and the point in time that the reset button 46 was pressed. That is, the replacement history data includes the date and the point in time that the consumable part was replaced. The replacement history data includes the type of the consumable part and the replacement reason. The replacement history data includes the usage rate when the consumable part was replaced. The replacement history data includes the arc time period and the piercing frequency when the consumable part was replaced.

The screen 51 for the replacement history data includes selection buttons 53 for selecting a display period. The user selects display period of the replacement history data by pressing a selection button 53. The controller 5 displays, on the screen 51 for the replacement history data, the replacement history data of the consumable replaced during the display period selected with the selection button 53. The display time periods include, for example, one day, one week, one month, or all items.

The screen 51 for the replacement history data includes an output button 54. The controller 5 outputs the replacement history data when the output button 54 is pressed. For example, the controller 5 prints the replacement history data. Alternatively, the controller 5 may output the replacement history data as electronic data. The controller 5 may output the replacement history data through a communication network. Alternatively, the controller 5 may output the replacement history data through a recording medium.

As illustrated in step S110 in FIG. 5, the controller 5 ends the processing. The controller 5 ends the processing when all the processing prescribed in the cutting program is finished. The controller 5 may interrupt the processing when it is determined, in step S108, that the electrode 11 or the nozzle 12 has reached the machine lifetime. In this case, the controller 5 may restart the processing when the replacement of the consumable part is implemented and the reset button 46 on the part replacement screen 41 is pressed.

Figure 8:
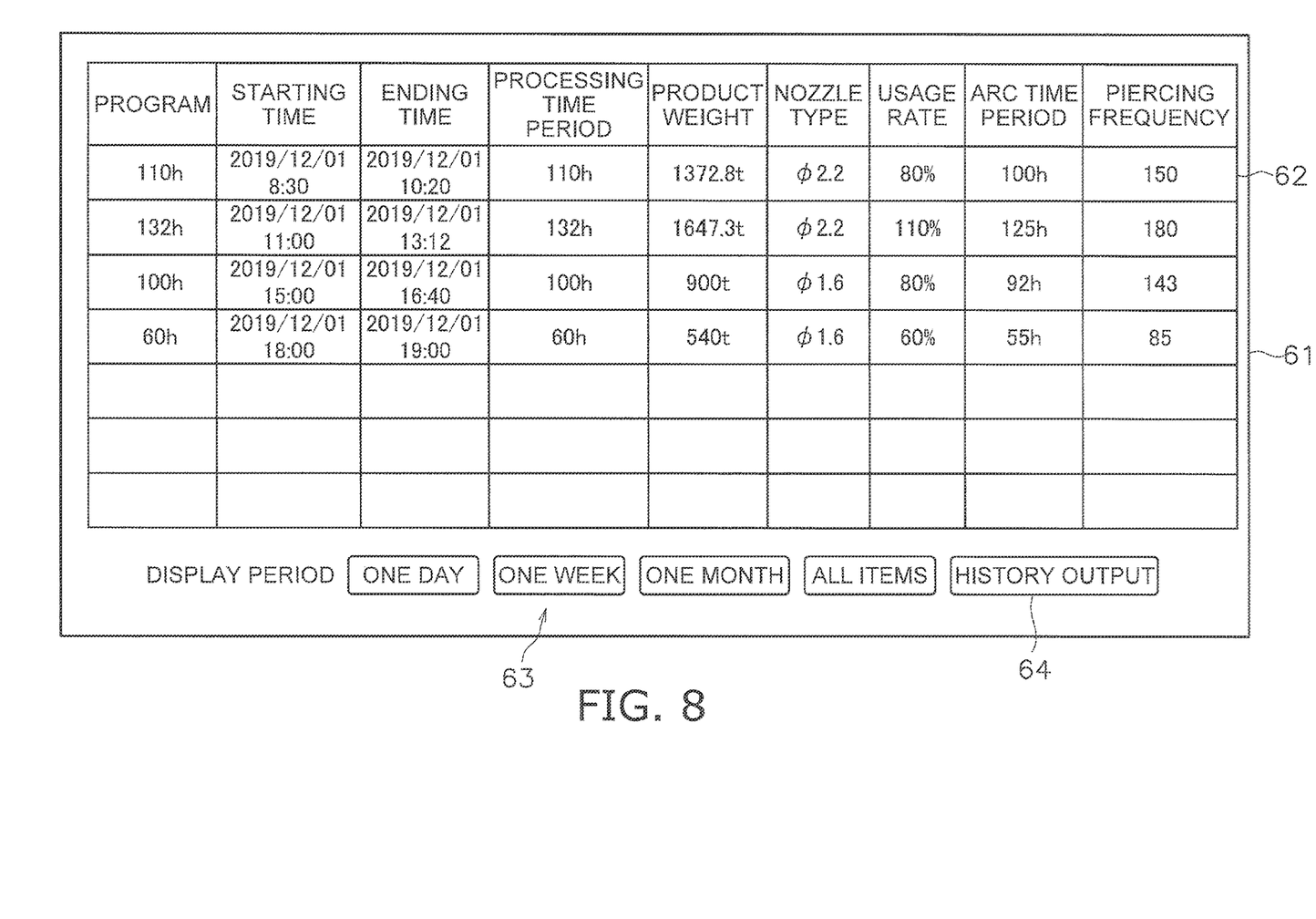
FIG. 8 illustrates a screen for processing performance data.

The controller 5 records the ending time of the processing in step S111 when the processing is ended. The ending time of the processing indicates the date and point in time that the processing was finished. In step S112, the controller 5 records the processing performance data. FIG. 8 illustrates a screen 61 for the processing performance data. The controller 5 displays the screen 61 for the processing performance data on the display 28. The screen 61 for the processing performance data includes a list 62 which indicates the processing performance data for each cutting program.

The processing performance data includes an identification number of the cutting program. The cutting program includes data which indicates the identification number of the cutting program. The controller 5 acquires the identification number of the applicable cutting program from the cutting program. The controller 5 records a plurality of parameters included in the processing performance data and the identification number of the cutting program correlated with each other in the storage device 32.

The processing performance data includes the starting time, the ending time, and the processing time of the processing. The processing time indicates the time period from the start to the end of the processing. The processing performance data includes the product weight. The product weight indicates the total weight of the work piece M1 cut out in one cutting program. The processing performance data includes the arc time period and the piercing frequency.

The processing performance data includes the types and the usage rates of the consumable parts. The usage rates in the processing performance data indicate the total usage rates of the consumable parts from the start to the end of the processing in one cutting program. For example, when a consumable part is replaced during processing in one cutting program, the controller 5 calculates the total usage rate of the plurality of consumable parts. Therefore, the usage rate in the replacement history data may exceed 100%.

The screen 61 for the processing performance data includes a selection button 63 for selecting the display period in the same way as the screen 51 for the replacement history data. The user selects a display time period for the processing performance data by pressing the selection button 63. The screen 61 for the processing performance data includes an output button 64. The controller 5 outputs the processing performance data when the output button 64 is pressed. The selection button 63 and the output button 64 of the screen 61 for the processing performance data are respectively similar to the selection button 53 and the output button 54 of the screen 51 for the replacement history data and therefore a detailed explanation is omitted.

The abovementioned screens 41, 51, and 61 are screens pertaining to the nozzle 12. The controller 5 also generates screens pertaining to the electrode 11 on the display 28 for the electrode 11 in the same way as the screens 41, 51, and 61 pertaining to the nozzle 12.

According to the plasma cutting machine 1 as in the present embodiment discussed above, processing performance data is recorded that includes the weight of the work piece M1 and the consumption amounts correlated with each other. Consequently, the processing cost concerning the processing amount of the plasma cutting machine 1 can be understood accurately.

Although an embodiment of the present invention has been described so far, the present invention is not limited to the above embodiment and various modifications may be made within the scope of the invention.

The configuration of the plasma cutting machine 1 is not limited to the configuration of the above embodiment and may be modified. The abovementioned processing of the controller 5 may distributed and executed among a plurality of controllers. The order of the abovementioned processing may also be modified. A portion of the abovementioned processing may be omitted or modified. Processing different from the abovementioned processing may be added.

Figure 9:
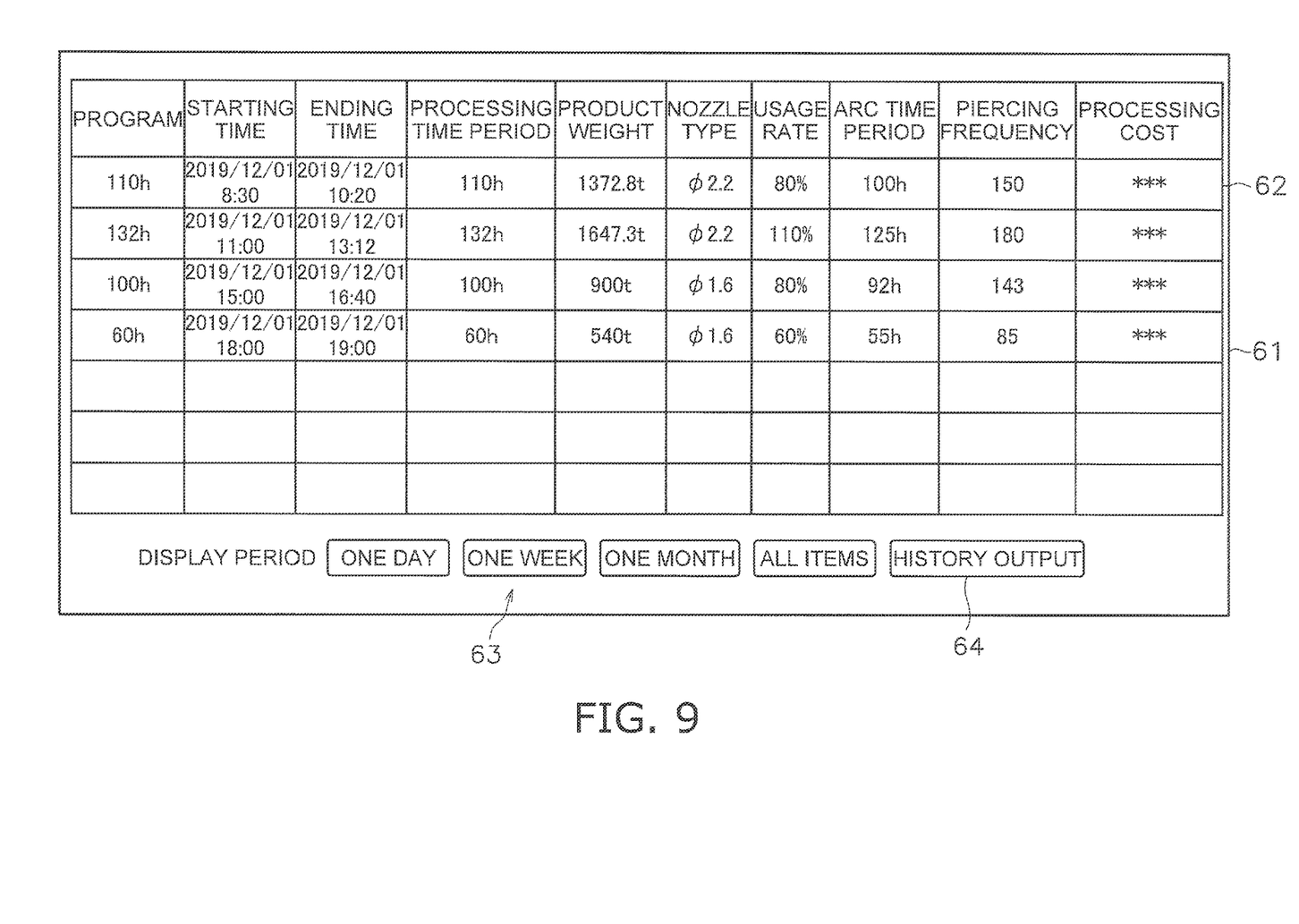
FIG. 9 illustrates a screen for processing performance data according to a modified example.

The parameters included in the processing performance data are not limited to the embodiment and may be modified. For example, as illustrated in FIG. 9, the processing performance data may also include a processing cost of the work piece M1. The processing cost indicates the processing cost per unit of weight of the work piece M1. For example, the processing cost indicates the processing cost per one ton of the work piece M1. The processing cost may indicate the usage rate of a consumable per unit of weight of the work piece M1. The processing cost may indicate the expense of a consumable per unit of weight of the work piece M1. The controller 5 may calculate the processing cost of the work piece M1 from the replacement history data and the weight of the work piece M1.

The controller 5 may acquire the electric power amount used by the plasma cutting machine. The controller 5 may calculate the processing cost of the work piece M1 from the electric power amount, the replacement history data, and the weight of the work piece M1. For example, the controller 5 may add the expense corresponding to the used electric power amount, to the processing cost.

The controller 5 may acquire the gas amount used by the plasma cutting machine. The controller 5 may calculate the processing cost of the work piece M1 from the gas amount, the replacement history data, and the weight of the work piece M1. For example, the controller 5 may add the expense corresponding to the used gas amount, to the processing cost.

The replacement history data and the processing performance data may be generated for only one of the electrode 11 and the nozzle 12. Alternatively, in the case of a consumable part unit formed by integrating the electrode 11 and the nozzle 12, the replacement history data and the processing performance data may be generated for the consumable part unit.

What is claimed is:

1. A plasma cutting machine for cutting a work piece with a plasma arc, the plasma cutting machine comprising:
   a plasma torch including an electrode and a nozzle, the plasma torch being configured to generate the plasma arc;
   a drive device configured to move the plasma torch; and
   a controller including a storage device configured to record information pertaining to the plasma cutting machine,
   the controller being configured to
      control the drive device,
      acquire a weight of the work piece,
      acquire a consumption amount of at least one of the electrode and the nozzle, and
      record, in the storage device, processing performance data including the weight of the work piece and the consumption amount correlated with each other.

2. The plasma cutting machine according to claim 1, wherein
   the controller is further configured to
      receive a cutting program from a computer that generates the cutting program indicative of a track of the plasma torch to cut the work piece, and
      acquire the weight of the work piece from the computer.

3. The plasma cutting machine according to claim 2, wherein
   the cutting program includes data indicative of the weight of the work piece.

4. The plasma cutting machine according to claim 2, wherein
   the controller is further configured to acquire an identification number of the cutting program, and
   the processing performance data includes the identification number.

5. The plasma cutting machine according to claim 1, wherein
   the controller is further configured to acquire replacement history data indicative that at least one of the electrode and the nozzle has been replaced, and
   the processing performance data includes the replacement history data.

6. The plasma cutting machine according to claim 5, wherein
   the controller is further configured to calculate a processing cost of the work piece from the replacement history data and the weight of the work piece.

7. The plasma cutting machine according to claim 5, wherein
   the controller is further configured to
      acquire an electric power amount used by the plasma cutting machine, and
      calculate a processing cost of the work piece from the electric power amount, the placement history data, and the weight of the work piece.

8. The plasma cutting machine according to claim 5, wherein
   the controller is further configured to
      acquire a gas amount used by the plasma cutting machine, and
      calculate a processing cost of the work piece from the gas amount, the placement history data, and the weight of the work piece.

9. The plasma cutting machine according to claim 6, wherein
   the controller is further configured to calculate the processing cost per unit weight of the work piece.

10. The plasma cutting machine according to claim 1, further comprising:
    a display configured to display information pertaining to the plasma cutting machine,
    the controller being further configured to display the processing performance data on the display.

* * * * *